Aug. 9, 1927.  
E. R. BURTNETT  
1,638,287  
INTERNAL COMBUSTION ENGINE  
Filed Jan. 4, 1923

Inventor:  
Everett R. Burtnett  
By Martin P. Smith, Atty.

Patented Aug. 9, 1927.

1,638,287

UNITED STATES PATENT OFFICE.

EVERETT R. BURTNETT, OF LOS ANGELES, CALIFORNIA, ASSIGNOR, BY DIRECT AND MESNE ASSIGNMENTS, TO THE AUTOMOTIVE VALVES CO., OF LOS ANGELES, CALIFORNIA, A VOLUNTARY TRUST.

INTERNAL-COMBUSTION ENGINE.

Application filed January 4, 1923. Serial No. 610,697.

My invention relates to an internal combustion engine of the four stroke cycle principle, and has for its principal objects, the provision of a full displacement, constant initial inert volume and supercharged variable volume, gaseous mixture internal combustion engine that will develop high minimum compression and a relatively large expansion volume, to provide for the operation of the engine with a constant, inert initial combustion piston displacement volume (either free air or cooled products of combustion) and a supercharge to said initial inert volume, of a gaseous mixture that is of variable quantity, in ratio to the constant inert volume, the variation providing the power range and controlled by throttling the gaseous mixture supply to the pumping cylinder, the latter performing the functions of a precompressor and supercharger for the combustion chamber, and further, to provide, in an engine of the character described, simple and efficient means for delivering a dual charge to each combustion chamber, each cycle, and which dual charge consists of a constant inert volume that is in ratio to the piston displacement of the combustion chamber and a gaseous mixture volume that is variable in quantity by throttle control.

A further object of my invention is to provide a balanced crank shaft arrangement in a multi-cylinder internal combustion engine having four cylinders arranged for operation on the four stroke combustion cycle and two cylinders arranged for operation as pumps of the two stroke function cycle, the six cylinders being arranged in a row, with the two end cylinders and the two center cylinders functioning as combustion or power cylinders with the second cylinder from each end and located between the combustion cylinders, functioning as pumping or precompression cylinders, the combustion cylinders operating on the four stroke cycle principle and the pumping cylinders operating on the two stroke cycle principle, and said engine being provided with valves and alternate period timing and actuating means for bringing about the discharge of each pump function, of each of the pumping cylinders, alternately to the two immediately adjacent combustion cylinders.

With the foregoing and other objects in view, my invention consists in certain novel features of construction and arrangement of parts that will be hereinafter more fully described and claimed and illustrated in the accompanying drawings in which:—

Figure 1:
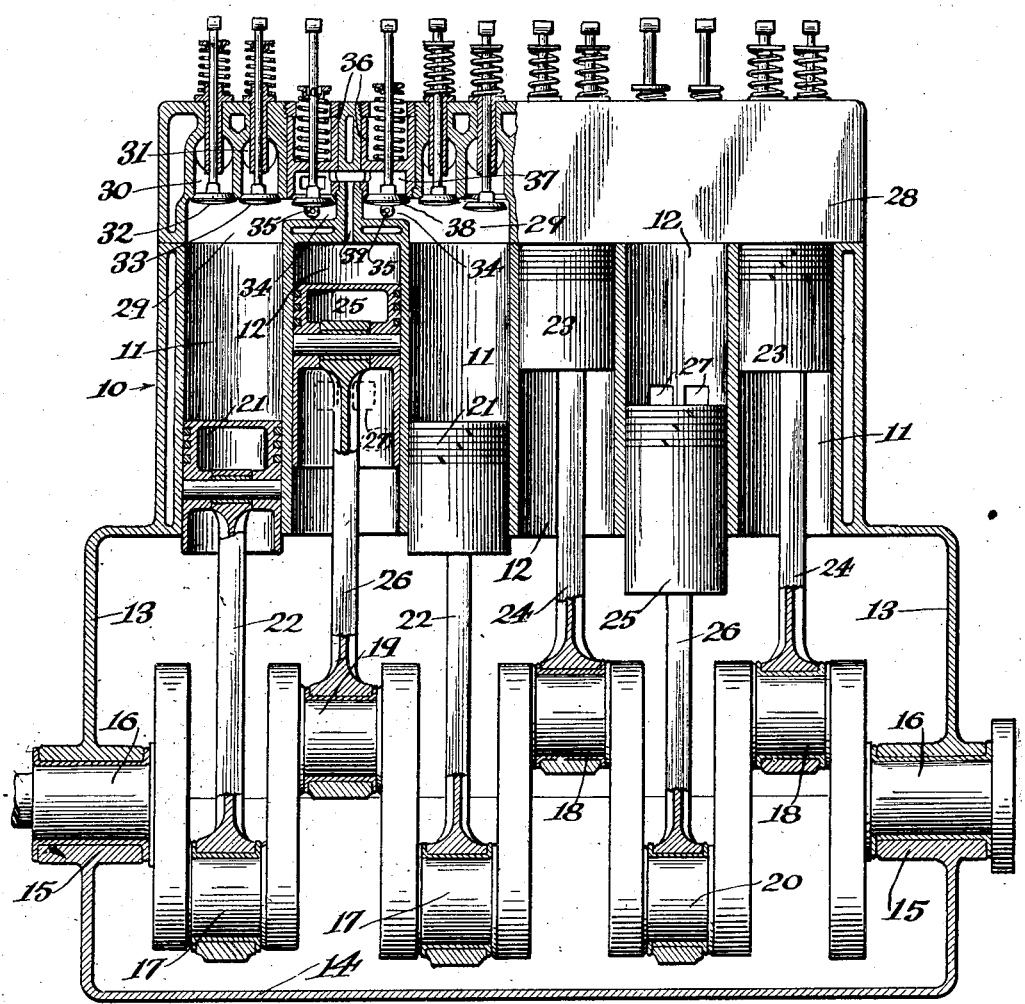
Fig. 1 is a vertical section taken lengthwise through the center of an engine of my improved construction.

Referring by numerals to the accompanying drawings which illustrate a practical embodiment of my invention, 10 designates a cylinder block in which are formed four chambers 11 in which combustion and expansion takes place, and two chambers 12, in which precompression of gaseous fuel is effected.

These six chambers are preferably aligned or arranged in a row and with a precompression chamber disposed between the members of each pair of combustion chambers.

Thus, from either end of the block, the first, third, fourth and sixth cylinders contain combustion chambers, while the second and fifth chambers function as gaseous fuel compression chambers.

Depending from block 10 is a hollow structure 13 that combines with a pan-like member 14 in forming a crank case and formed in the ends of the latter are bearings 15 for a crank shaft 16.

This shaft is formed with two pairs of cranks 17 and 18 and the members of pair 17 are disposed directly opposite, or approximately 180 degrees from the members of pair 18.

Formed between the members of pair 17 of the cranks, is a crank 19 that occupies a radial position of approximately 155 or 160 degrees in advance of the cranks 17 in the direction of crank shaft rotation.

Likewise a crank 20 is formed between the members of the pair of cranks 18 and said cranks 20, occupying a radial position of approximately 155 or 160 degrees in advance of said cranks 18 in the direction of crank shaft rotation.

Figure 2:
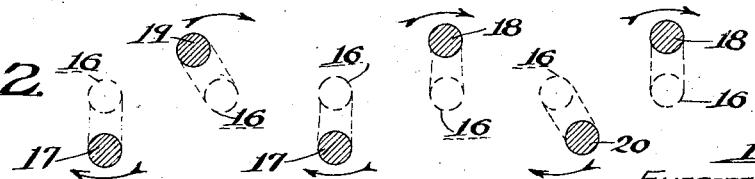
Fig. 2 is a diagrammatic view that graphically illustrates the relative positions of the cranks on the crank shaft of my improved engine.

The relative positions of the various cranks are clearly illustrated in the diagrammatic view Fig. 2.

Arranged for reciprocatory movement within the combustion chambers 11 that are directly above cranks 17, are pistons 21 that are connected in the usual manner to the respective cranks 17 by connecting rods 22.

Likewise, pistons 23 that are arranged for reciprocatory movement within the chamber 11 that are positioned above cranks 18, are connected in the usual manner to the respective cranks 18 by connecting rods 24.

Thus when power pistons 21 are at top center, the pistons 23 are at their low centers and vice versa.

Arranged for operation within the compression chambers 12 are pistons 25 and connecting these pistons to the respective cranks 19 and 20 are connecting rods 26.

Formed through the wall of the block 10 and entering the compression chambers 12, are gaseous fuel inlet ports 27, the same being located so as to be wholly uncovered only when the pistons 25 are at their low centers.

These inlet ports are connected in any suitable manner to a source of gaseous fuel supply, preferably a carburetor, (not shown.)

Secured on the upper end of block 10, is a head block 28, having formed in its under face, a series of four pockets or depressions 29, each of which coincides with and forms a short extension for the corresponding one of the combustion chambers 11.

Formed through block 28, and leading to the upper portion of each pocket or depression 29, is an exhaust duct 30 and an initial inert charge volume inlet duct 31.

Each exhaust duct is provided, at its inner end with a seat for an inwardly opening poppet valve 32, and the inner end of each inlet duct 31 is provided with a seat for an inwardly opening poppet valve 33.

All the poppet valves are normally retained in closed positions upon their seats by springs that are associated with their stems, and said valves are forced off their seats by any conventional poppet valve actuating mechanism, for instance, rocker arms and push rods that are controlled and actuated by cams on a cam shaft and which latter may be driven from the crank shaft 16.

Each pocket or chamber 29 is provided with a lateral extension 34 that serves as an ignition chamber, inasmuch as the terminals of the electrodes of a spark plug 35, that is seated in the side wall of the head block, project into said chamber.

Removably seated in block 28, directly above each ignition chamber 34 is a valve cage 36 and the lower end of each cage communicates with one of the chambers 34.

The lower end of the chamber 37, within the lower portion of each cage 36 is normally closed by a springheld poppet valve 38.

Leading upwardly from the supercharging chamber 12, is a duct 39, the upper end thereof communicating by means of branch ducts, with the chambers 37 above the valves 38.

The operation of my improved engine is as follows: As one of the pistons 21 or 23 passes its high center following its compression stroke, a spark is produced between the terminals of the electrodes of the corresponding spark plug 35, thereby igniting the charge of gaseous fuel that is compressed within the corresponding chamber 29 and its lateral extension 34.

The force of expansion resulting from combustion of the compressed gaseous fuel charge will be directed against the head of the corresponding piston to drive the same downwardly on its power stroke and the motion and power thus developed is transmitted to crank shaft 16 through the corresponding connecting rod 22 or 24.

As the power piston approaches its low center succeeding this power stroke, the corresponding exhaust valve 32 is unseated, thereby permitting the pressure within the corresponding chamber 11 to drop to practically atmospheric pressure, and on the succeeding upward stroke of the piston, a substantial portion of the burnt products of combustion will be forced past the open exhaust valve and out through the corresponding duct 30.

As the piston passes high center following its exhaust stroke, exhaust valve 32 closes and immediately the inert charge inlet valve 33 is opened and held so while the piston is travelling downward on its succeeding or suction stroke.

During this suction stroke, an inert charge volume of air or cooled products of combustion is drawn into the combustion chamber through duct 31 and at the end of this suction stroke or when the piston reaches its low center, inlet valve 33 closes and the corresponding precompressed gaseous fuel inlet valve is opened, thereby admitting into the upper end of the combustion chamber, and on top of the inert charge therein, a charge of precompressed gaseous fuel.

The gaseous fuel forming this supercharge is admitted to the adjacent precompression chamber 12 while the piston 25 therein is at its low center and the corresponding fuel inlet ports 27 are uncovered. On the succeeding upward stroke of the piston 25, the admitted charge of gaseous fuel will be compressed to a relatively high degree in the upper portion of chamber 12 and when highest compression is reached, the corresponding valve 38 is opened, thereby permitting the compressed charge to pass through duct 39, chamber 37 and chamber 34 into combustion chamber 11.

This highly compressed charge of gaseous fuel will readily enter the combustion chamber, inasmuch as it is admitted to said chamber before the piston 21 therein has moved any considerable distance upwardly on its compression stroke.

As the piston 21 moves to the upper end of its compression stroke, the admitted inert volume and the precompressed gaseous fuel charge will be compressed in stratified relation within chambers 29 and 34, with the stratum of compressed gaseous fuel within chamber 34 and the stratum of compressed air or cooled products of combustion within the chamber 29.

As piston 21 passes high center, the compressed charge of gaseous fuel within chamber 34 will be ignited by a spark produced at the inner end of the spark plug and, as a result, said piston 21 will be forced downwardly on its power stroke as hereinbefore described.

The power pistons 21 operate on the four stroke cycle principle, while the compression pistons operate on the two stroke cycle principle and, as a result, each compression piston functions alternately to the two power cylinders with which it is directly associated.

Thus it will be seen that I have provided an internal combustion engine that is of relatively simple structure and which operates with a constant pressure, inert, initial displacement volume and a supercharge of gaseous fuel, the latter being of variable quantity in ratio to the constant, inert volume and which provision is effective in developing a high minimum compression and great expansion volume.

Minor changes in the size, form and construction of my improved engine may be made and substituted for those herein shown and described without departing from the spirit of the invention, the scope of which is set forth in the appended claims.

I claim as my invention:

1. An internal combustion engine having a combustion cylinder and a pumping cylinder, an exhaust valve adapted to open during the exhaust stroke of the engine, an inert volume inlet valve adapted to open during the suction stroke of the engine, a supercharge gaseous fuel transfer valve adapted to open during the first part of the compression stroke of the engine, all of said valves being arranged in the head of the combustion cylinder and disposed parallel with the crank shaft of the engine, there being a port formed in the wall of the pumping cylinder adapted to be uncovered as the piston passes outer dead center, so as to admit gaseous fuel into said pumping cylinder.

2. An internal combustion engine unit comprising three cylinders arranged in a row, the two outside cylinders functioning as combustion cylinders, the middle cylinder functioning for the pre-compression of gaseous fuel, a head closing the head ends of the chambers within said cylinders, said head being provided with inlet and exhaust ducts that communicate with the chambers in the combustion cylinders, valves normally closing said inlet and exhaust ducts, a duct leading upwardly in said head from the upper end of the chamber in the pre-compression cylinder, said duct having branches that communicate with the chambers in the head above the combustion chambers, valves normally closing said branch ducts, the pre-compression chamber being provided intermediate its ends with a gaseous fuel inlet port, a three throw crank shaft, the two outer throws of which crank shaft occupy the same radial plane and being arranged 180° from the third crank throw, pistons within the three cylinders and connections from the three pistons to the three throws of said crank shaft.

3. The herein described method of operating an internal combustion engine which consists in admitting to the combustion chamber within said engine an initial inert cooled volume charge for substantially the entire suction stroke of the piston within said combustion chamber, compressing said initial charge volume within said combustion chamber, admitting into said combustion chamber, before highest compression of the charge volume first admitted thereto has been effected, a supercharge of precompressed gaseous fuel, the latter occupying a stratum on top of the stratum of charge volume first admitted, compressing said stratum of initial charge volume and stratum of gaseous fuel, igniting the compressed charge at the time of highest compression of the compressed volume within the combustion chamber and permitting the exhaust of burnt gases of combustion from said combustion chamber.

In testimony whereof I have signed my name to this specification.

EVERETT R. BURTNETT.